Patented May 2, 1950

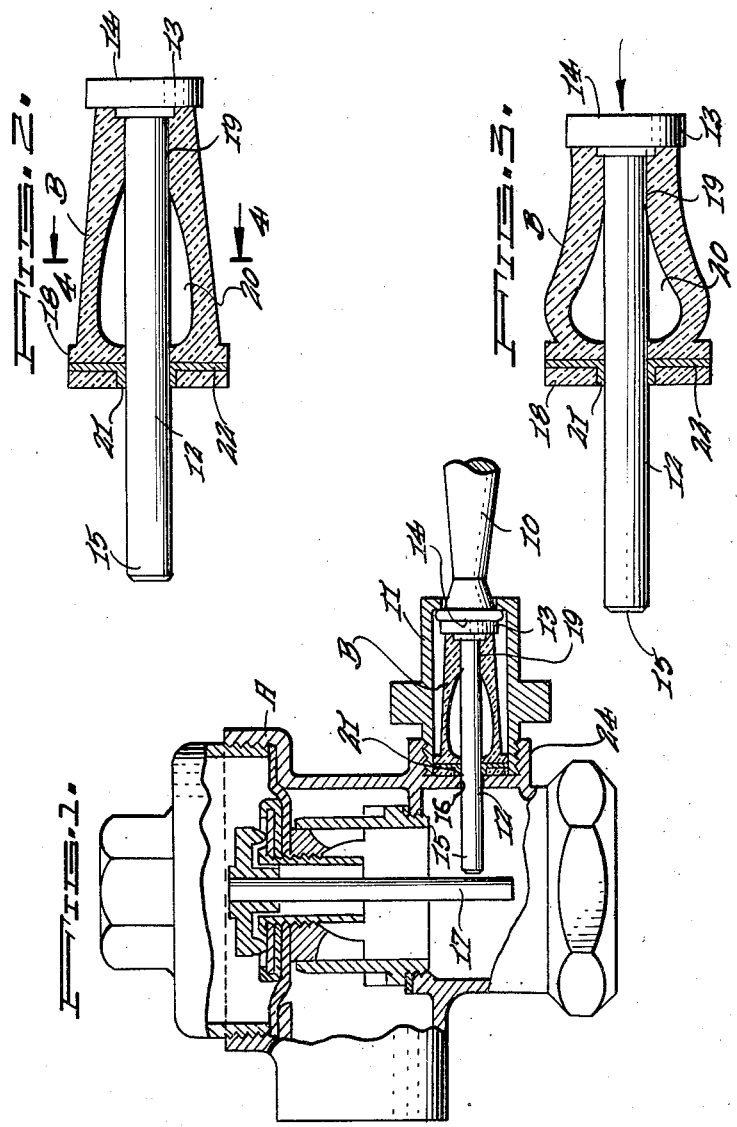

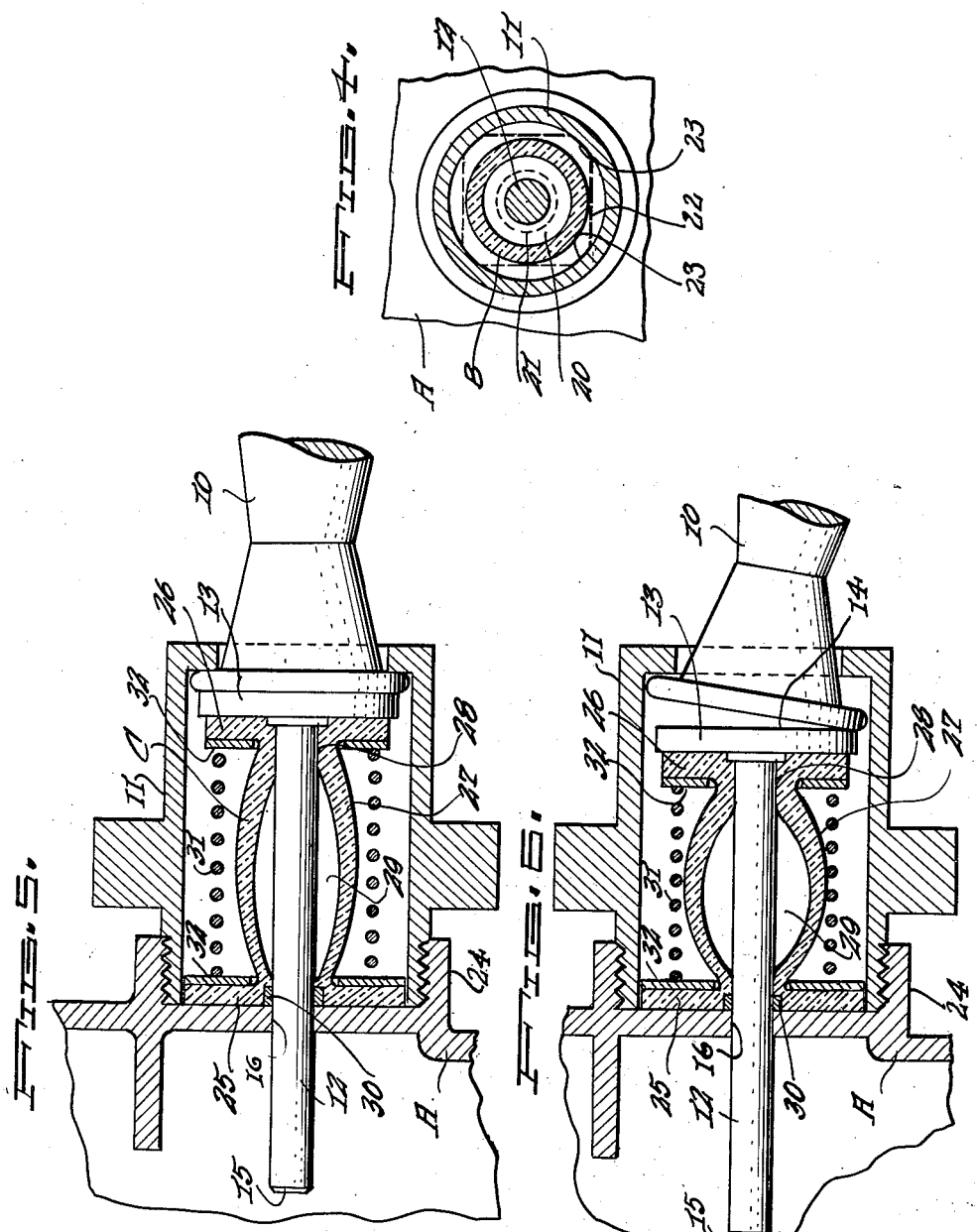

2,506,140

UNITED STATES PATENT OFFICE 2,506,140

SEAL UNIT FOR FLUSH VALVE ACTUATORS

John J. Delany, Brooklyn, N. Y., assignor to Delany Realty Corporation, Brooklyn, N. Y., a corporation of New York Application July 26, 1946, Serial No. 686,575

2 Claims. (Cl. 286—29)

1

This invention relates to valves and while not limited thereto the same has particular reference to an improved construction for sealing the actuator member of a flush valve and for maintaining the same in tensioned engagement against the inner end of the operating handle.

The invention comprehends a resilient unit located in the handle cap of the flush valve in surrounding relation with the shank of the actuator member and which is axially and radially contractible and expansible to permit of inward movement of the actuator member upon manipulation of the handle while tensioning the same to effect outward movement thereof upon release of the handle.

The invention further has for an object a flexible elastic unit which is tensioned at its opposite ends against the end of the actuator member and the apertured wall of the valve body through which the free end of the shank thereof protrudes and which is deformable intermediate its end whereby the same is axially and radially contractible and expansible for sealing the handle cap and for tensioning the actuator member so as to effect the return thereof upon release of the handle.

Another object of the invention is the provision of a flexible elastic unit of said character having a metal insert embedded in a flanged end thereof for preventing canting or distortion thereof and maintaining the shank of the actuator member in centralized relation.

With the foregoing and other objects in view, reference is now made to the following specification and accompanying drawings in which the preferred embodiments of the invention are illustrated.

In the drawings:

Fig. 1 is a view in elevation of a flush valve constructed in accordance with the invention and with a portion thereof shown in vertical section.

Fig. 2 is an enlarged sectional view of the elastic unit in position on the actuator member.

Fig. 3 is a similar view showing the elastic unit in contracted relation.

Fig. 4 is a vertical sectional view taken approximately on line 4—4 of Fig. 2.

Fig. 5 is a fragmentary sectional view of a flush valve provided with a modified form of elastic unit embodying the invention.

Fig. 6 is an enlarged sectional view of the elastic unit in position on the actuator member.

Referring to the drawings by characters of reference, the invention is illustrated in its application to a flush valve indicated generally by the reference character A and which is of the type provided with an operating handle 10 projecting laterally outward from the handle cap 11 with the enlarged inner end of the handle located

2 within the cap and abutting against an actuator member 12.

The actuator member 12 is formed with an enlarged head 13 having parallel opposite faces arranged with the outer face 14 disposed flatly against the inner face of the enlarged inner end of the operating handle 10 and inwardly of said head the actuator member includes a shank 15 which protrudes inwardly through an aperture 16 in the wall of the valve body with the inner end of the shank located adjacent the lower end of the valve stem 17 for tilting the same to thereby effect opening movement of the valve upon actuation of the manipulating handle 10.

In order to provide means for tensioning the actuator member 12 and for maintaining the same in normally retracted relation with the enlarged head thereof disposed flatly against the enlarged inner end of the manipulating handle 10, the present invention provides a resilient unit B fashioned of flexible resilient material such as natural or synthetic rubber and which is of hollow formation and is located within the handle cap 11 in surrounding relation with the shank 15 and respectively tensioned at its ends against the enlarged head 13 thereof and the wall of the valve body surrounding the aperture 16.

The resilient unit B is preferably of frusto-conical shape in longitudinal sectional formation with a peripheral flange 18 at the inner enlarged end thereof. The reduced outer end of the unit is provided with a restricted bore portion 19 which opens through the outer end thereof and inwardly of said bore portion the inner face of the peripheral wall thereof flares outwardly to provide an annular recess 20 surrounding the shank 15 of the actuator member with the restricted bore portion 19 snugly engaging about the outer end of the shank adjacent the enlarged head 13 thereof. A flanged metallic sleeve 21 is embedded in the flanged end 18 of the unit with the tubular portion of the sleeve slidably disposed on the shank 15 and with the flange 22 thereof extending radially outward therefrom and protruding at quadrantly spaced points 23 through the peripheral edge of the flanged end of the unit for engagement against the inner face of the peripheral wall of the handle cap 11. This construction provides a reduced thickness in the wall of the unit approximately one-third the length of the unit from the inner end thereof whereby the flanged end 18 of the unit is retractible and expansible axially of the shank 15 of the actuator member and the peripheral wall of the unit annularly about the recess 20 is expansible and contractible radially thereof which takes place with the axial movement of the flanged end as illustrated in Fig. 3 of the drawings.

When the manipulating handle 10 is actuated to open the valve, the enlarged inner end of the handle is canted to thereby force the actuator 12 inwardly and increase the tension on the unit B which is axially contracted and radially expanded adjacent the flanged end 18 thereof. Upon release of the handle member 10 the expansive action of the unit B functions to force the actuator member 12 outwardly to its normal position against the enlarged inner end of the handle member 10 with the unit B disposed in its normal position tensioned against the outer end of the actuator member 12 and the wall of the valve body surrounding the aperture 16.

The flanged end 18 of the unit engaging at all times against the wall of the body surrounding the aperture 16 seals the said aperture and prevents the passage of liquid from the valve body into the handle cap 11 which is threadedly secured at its inner end in the interiorly threaded boss 24 of the valve casing. The restricted bore portion 19 of the unit snugly engaging about the shank 15 of the actuator member 12 functions to seal the outer end of the unit and thereby prevent leakage of the fluid therethrough, while the flanged sleeve 21 retains the flanged end 18 centrally within the handle cap 11 so as to prevent canting or distortion of the flanged end 18 and to maintain the shank 15 in centralized relation.

In the form of the invention illustrated in Figs. 5 and 6 of the drawings, the unit designated generally by the reference character C is similarly fashioned from flexible resilient material such as natural or synthetic rubber or the like and the same consists of a tubular body having flanged ends 25 and 26 and an intermediate reduced portion 27 provided with a peripheral wall of longitudinal and outwardly bowed formation in cross-sectional configuration. The unit C is adapted to be arranged on the shank 15 of the actuator member 12 of the flush valve A similar to the unit B in the previous form of the invention. The unit C is similarly formed with a restricted bore portion 28 which snugly engages the shank 15 adjacent the enlarged end 13 thereof and inwardly from the said restricted portion 28 the inner face of the peripheral wall 27 is of concave formation to provide an annular space 29 surrounding the shank 15 while the inner end of the unit is provided with a metallic sleeve 30 which surrounds the shank 15 for longitudinal reciprocatory sliding movement of the shank 15 therethrough. The intermediate portion 27 of the unit C is radially expansible and contractable coincident with the axial expansion and contraction of the unit as illustrated in Fig. 6 of the drawings, the bowed wall of the said intermediate portion being expanded farther outwardly with the axial contraction of the unit.

In order to tension the unit for axial or longitudinal expansion and contraction in addition to the inherent axial and longitudinal expansion and contraction thereof due to the resilient nature of the material thereof, a coiled expansion spring 31 is provided which is arranged between the flanged ends 25 and 26 and in surrounding spaced relation with the reduced portion 27 thereof with the opposite ends of the spring in engagement with metallic disks 32 disposed flatly against the inner faces of the flanged ends 25 and 26.

The resilient unit C functions to normally tension the actuator member 12 so as to maintain the enlarged end 13 thereof flatly against the enlarged inner end of the manipulating handle 10 and with the inner end thereof sealing the aperture 16 in the wall of the valve body. When the manipulating handle 10 is actuated to open the flush valve, the unit is axially compressed as illustrated in Fig. 6 of the drawings and upon release of the handle the same returns to the normal tensioned position illustrated in Fig. 5 of the drawings.

What is claimed is:

1. A sealing unit for flush valve actuator members consisting of a resilient body having a peripheral wall provided with parallel opposite end faces, said peripheral wall defining a passageway through said body adapted for receiving the shank of an actuator member therein with the medial portion of said passageway being of relatively larger cross-sectional area than the opposite end portions to provide a cavity medially of the length of said body surrounding the shank of the actuator member and with the axial outer end portion of said peripheral wall snugly fitting the outer end of the shank of the actuator member to form a seal therefor, said peripheral wall having a medial portion of reduced thickness to permit of the radial expansion and contraction of said medial portion with outward and inward reciprocatory movement of the inner end portion of said resilient body on the shank of said actuator, and a metallic sleeve fitted in the passageway in the axial inner end portion of said resilient body through which the inner end of the shank of the actuator member is slidable.

2. A sealing unit for flush valve actuator members consisting of a resilient body having a peripheral wall formed with flanged opposite ends having parallel opposite end faces, said peripheral wall defining a passageway through said body with the intermediate portion thereof being of relatively larger cross-sectional area than the outer end portions and adapted for receiving an actuator member therein with the outer end thereof snugly engaging in the flanged outer end portion of the passageway and the enlarged portion thereof forming a cavity surrounding the actuator member, said peripheral wall having a medial portion of reduced thickness to permit of radial expansion and contraction of said medial portion with outward and inward reciprocatory movement of the flanged inner end portion of said resilient body on said actuator, a coiled expansion spring disposed in surrounding relation with said resilient body between the flanges thereof and tensioned against said flanges for normally maintaining the flanged inner end thereof against inward movement, and a tubular metallic sleeve fitted in the passageway of the flanged inner end portion of said resilient body through which the inner end of the actuator member is slidable for retaining the actuator member in axial alignment in the passageway.

JOHN J. DELANY.

REFERENCES CITED

The following references are of record in the file of this patent:

UNITED STATES PATENTS

| Number | Name | Date |
|---|---|---|
| 630,940 | Sieben | Aug. 15, 1899 |
| 957,347 | Kennedy | May 10, 1910 |
| 1,614,468 | Haas | Jan. 18, 1927 |
| 2,251,219 | Brummer | July 29, 1941 |
| 2,255,322 | Langdon | Sept. 9, 1941 |
| 2,388,097 | Turner | Oct. 30, 1945 |

FOREIGN PATENTS

| Number | Country | Date |
|---|---|---|
| 1,185 | Great Britain | 1854 |